United States Patent [19]

Briggs

[11] Patent Number: 4,715,302
[45] Date of Patent: Dec. 29, 1987

[54] FOLDABLE DRILL IMPLEMENT WITH DIFFERENTIAL ASSEMBLY

[75] Inventor: Stanley E. Briggs, Minneapolis, Kans.

[73] Assignee: Briggs Manufacturing, Inc., Minneapolis, Kans.

[21] Appl. No.: 855,124

[22] Filed: Apr. 23, 1986

Related U.S. Application Data

[63] Continuation-in-part of Ser. No. 816,556, Jan. 6, 1986, abandoned, which is a continuation of Ser. No. 574,264, Jan. 26, 1984, Pat. No. 4,562,779.

[51] Int. Cl.$^4$ .......................... A01C 5/00; A01C 7/16; A01C 7/20
[52] U.S. Cl. .......................... 111/1; 111/34; 111/73; 198/577; 222/615; 239/675; 239/678
[58] Field of Search .................. 111/36, 57, 1, 8–14, 111/34, 52, 55, 56, 73, 77, 80, 85; 222/109, 318, 615, 56; 198/573, 577, 311–313, 601; 239/673, 675, 678, 677, 157, 159; 172/311

[56] References Cited

U.S. PATENT DOCUMENTS

| | | | |
|---|---|---|---|
| 2,369,755 | 2/1945 | Rosselot | 239/675 |
| 2,511,514 | 6/1950 | Rosselot | 239/675 |
| 2,596,898 | 5/1952 | Hoppes | 111/73 |
| 2,831,612 | 4/1958 | Smith | 239/675 |
| 2,947,544 | 8/1960 | Hurt | 414/526 |
| 3,137,181 | 6/1964 | Guilbert | 74/713 |
| 3,229,857 | 1/1966 | Kirschmann | 111/77 |
| 3,453,977 | 7/1969 | Sorenson | 111/36 |
| 3,470,768 | 10/1969 | Ford et al. | 74/713 |
| 3,512,489 | 5/1970 | Coldren et al. | 111/34 |
| 3,515,315 | 6/1970 | Kidd | 222/193 |
| 3,521,906 | 7/1970 | Parker | 280/413 |
| 3,581,945 | 6/1971 | Savage | 222/109 |
| 3,673,889 | 7/1972 | Hauser | 74/713 |
| 3,756,509 | 9/1973 | Hamnes | 239/675 |
| 3,809,316 | 5/1974 | Dreyer | 111/57 |
| 3,891,109 | 6/1975 | Olson | 414/526 |
| 3,971,446 | 7/1976 | Nienberg | 172/311 |
| 4,338,872 | 7/1982 | Decker | 111/56 |
| 4,379,413 | 4/1983 | Brammer et al. | 74/713 |
| 4,406,329 | 9/1983 | Schlueter | 111/52 X |
| 4,455,889 | 6/1984 | Hauser | 74/713 |
| 4,562,779 | 1/1986 | Briggs | 111/1 |

FOREIGN PATENT DOCUMENTS

| | | | |
|---|---|---|---|
| 1087463 | 10/1980 | Canada | 239/675 |
| 1929865 | 12/1969 | Fed. Rep. of Germany | 222/318 |
| 1800567 | 6/1970 | Fed. Rep. of Germany | 111/34 |
| 2008164 | 10/1970 | Fed. Rep. of Germany | 111/10 |
| 2162379 | 12/1971 | Fed. Rep. of Germany | 111/77 |
| 2455660 | 7/1975 | Fed. Rep. of Germany | 111/57 |
| 2456295 | 8/1975 | Fed. Rep. of Germany | 111/77 |
| 2436355 | 5/1976 | Fed. Rep. of Germany | 111/34 |
| 2901465 | 7/1979 | Fed. Rep. of Germany | 111/1 |
| 2001923 | 1/1969 | France | 111/34 |
| 2359452 | 3/1978 | France | 111/34 |
| 144898 | 11/1980 | German Democratic Rep. | 198/573 |
| 2023387 | 1/1980 | United Kingdom | 111/73 |
| 1009307 | 8/1983 | U.S.S.R. | 111/34 |
| 1127535 | 12/1984 | U.S.S.R. | 111/10 |

OTHER PUBLICATIONS

Anon., "Australian No-Air" Seeder, *Farm Show*, vol. 8, No. 6, (11/14/84), p. 27.

*Primary Examiner*—James R. Feyrer
*Attorney, Agent, or Firm*—Litman, McMahon & Brown

[57] ABSTRACT

A foldable drill implement has a supply hopper mounted on a center frame section and a rearwardly mounted broadcast hopper extending onto wing frame sections. Various augers connect the supply hopper to the broadcast hopper and maintain a level of fill in the broadcast hopper. Folding of the wing section relative to the center frame section utilizes swing plates and spacer plates to dampen oscillation of the wing sections. Controls regulate flow of material by sensing accumulated excess material and deactuating the augers. A differential assembly is provided for sensing torque pressure due to an accumulation of material in transverse broadcast augers to regulate flow.

6 Claims, 16 Drawing Figures

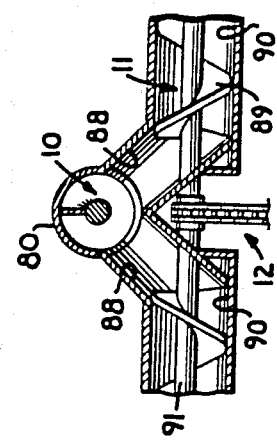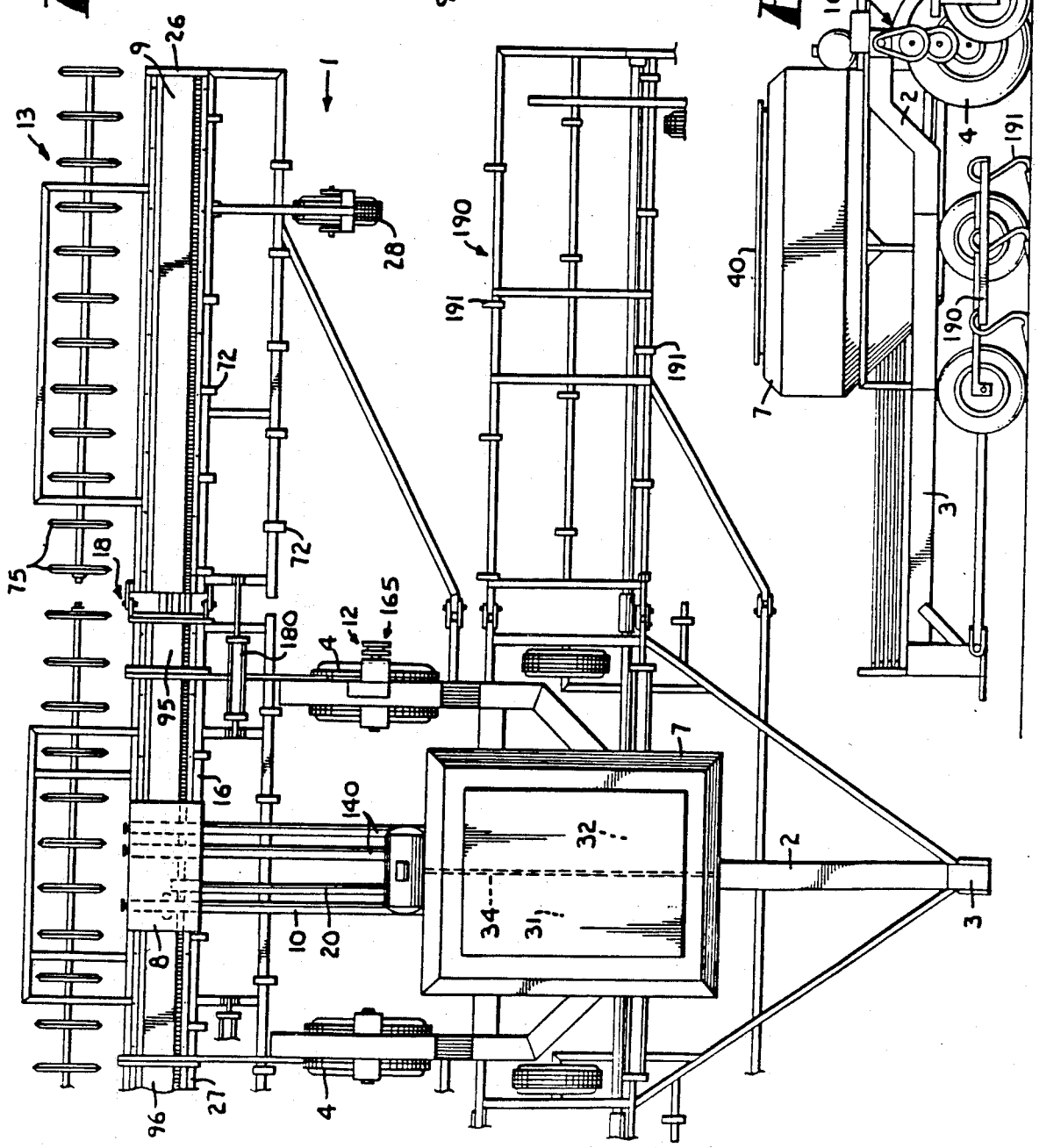

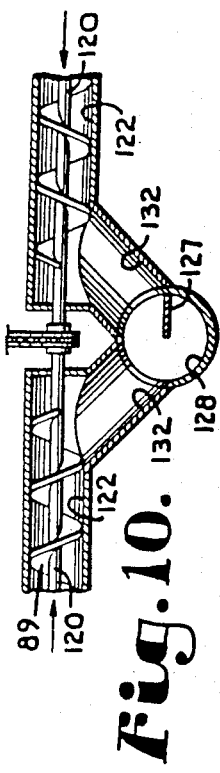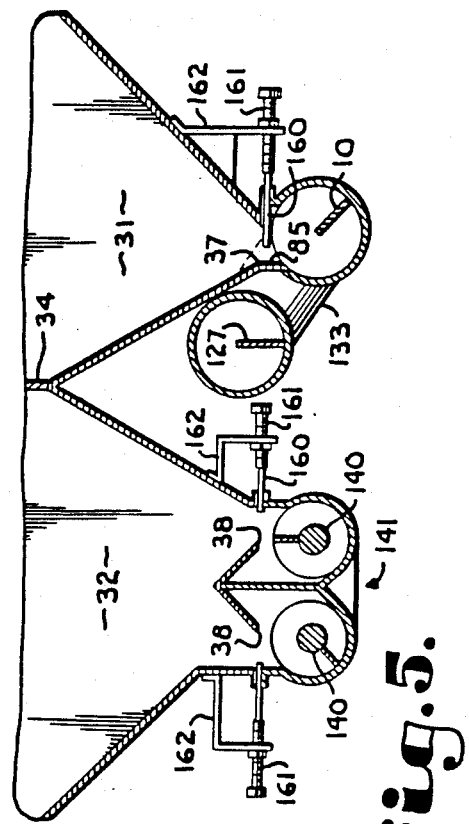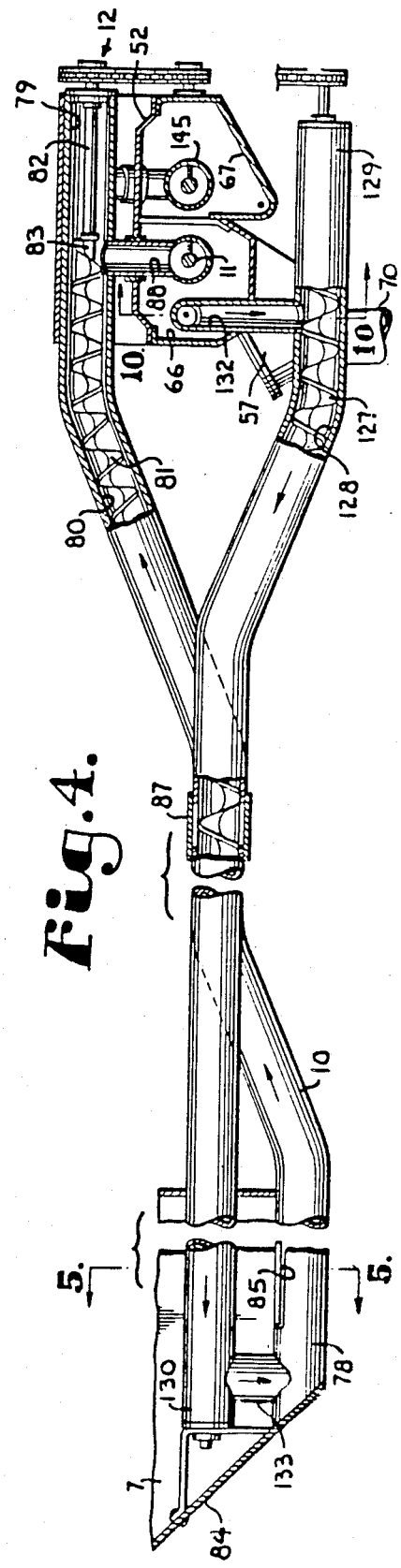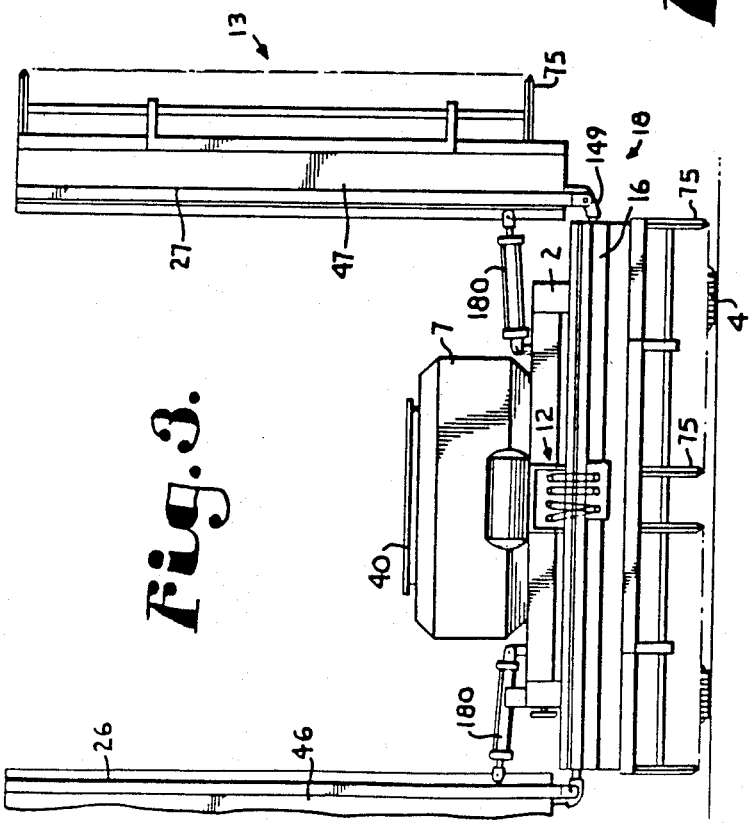

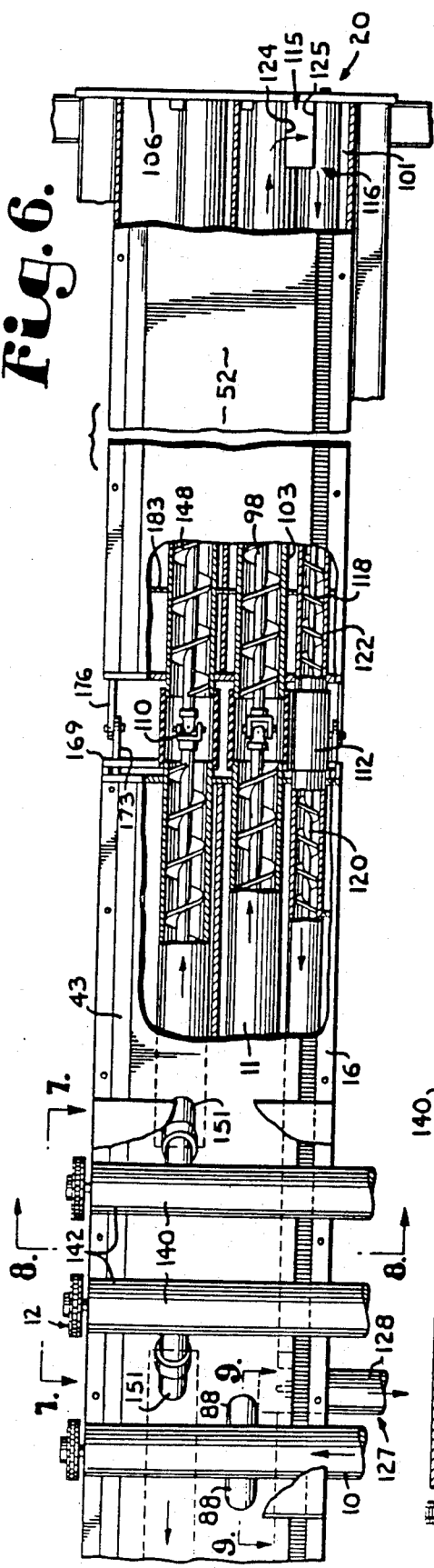
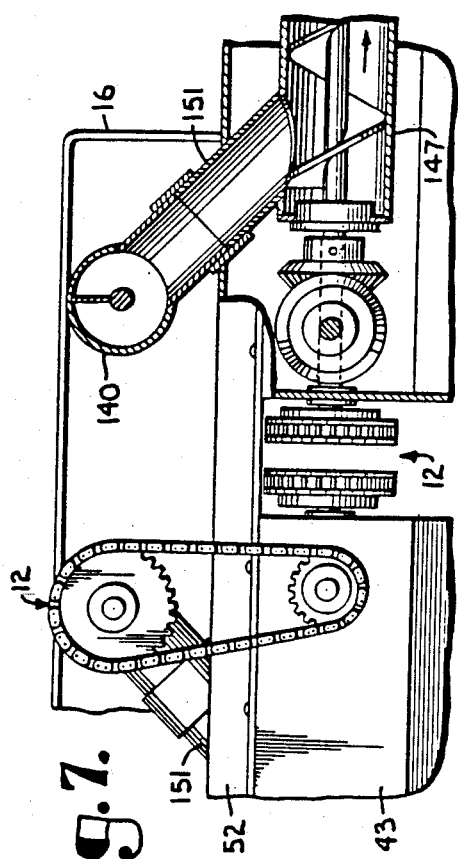
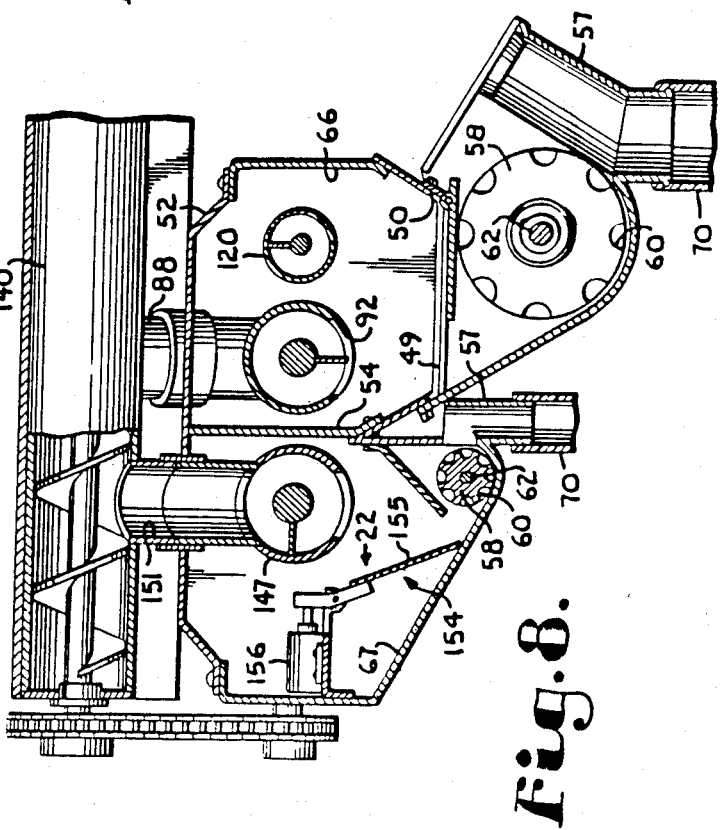

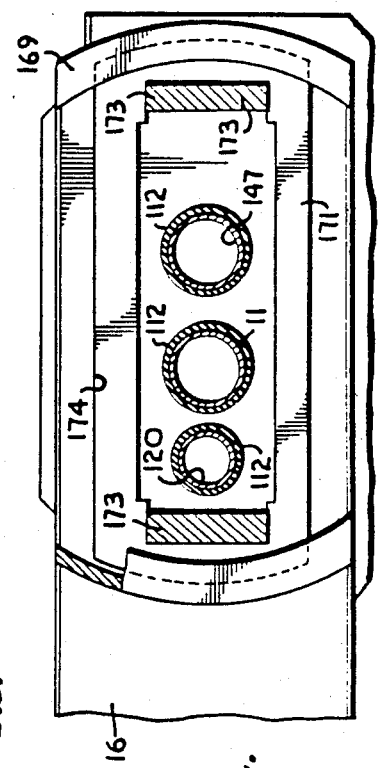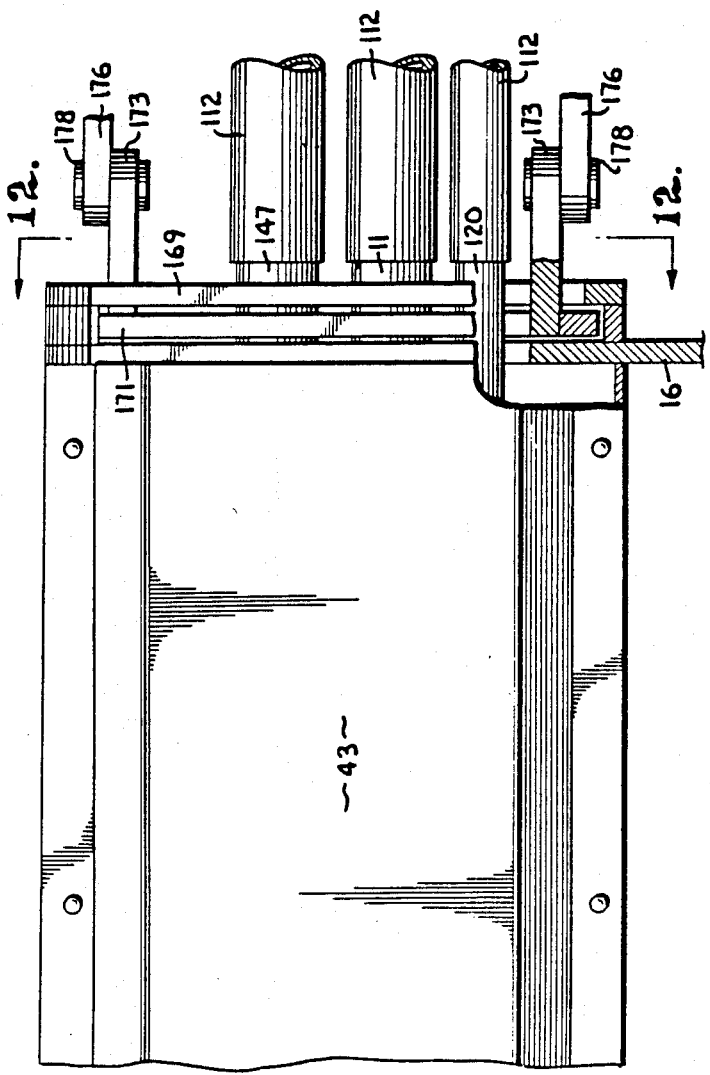

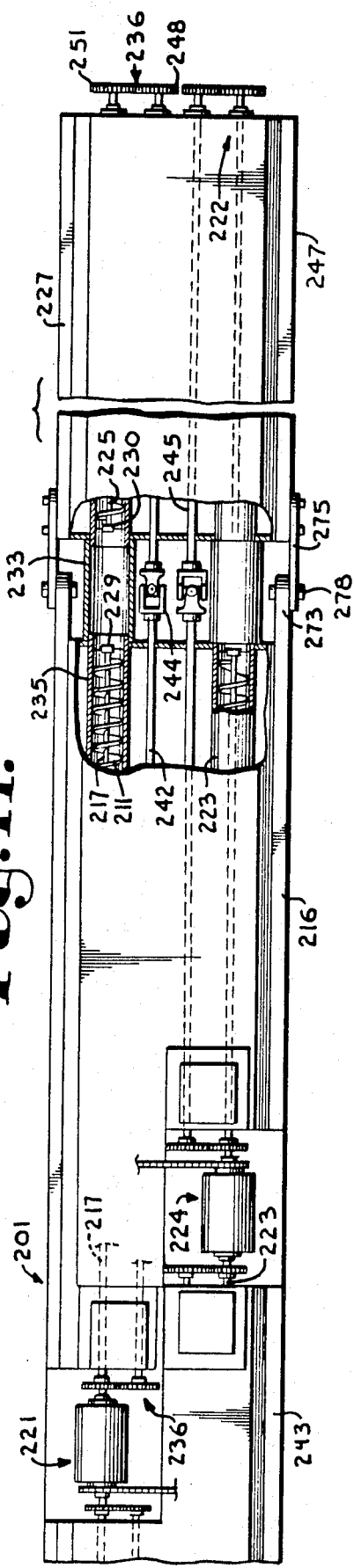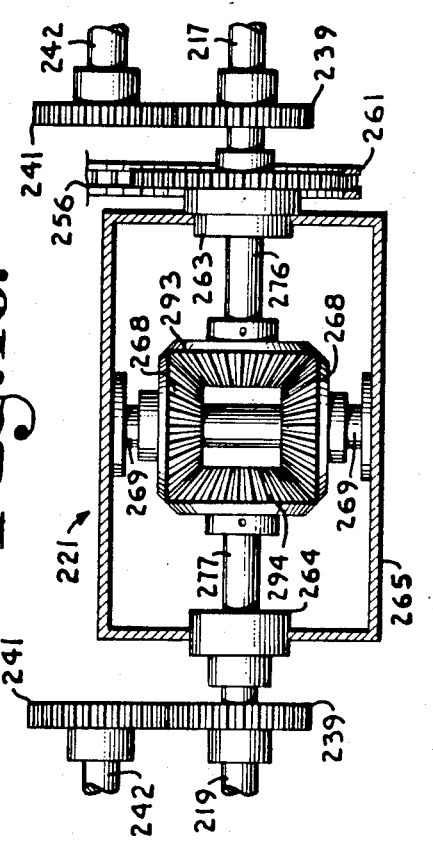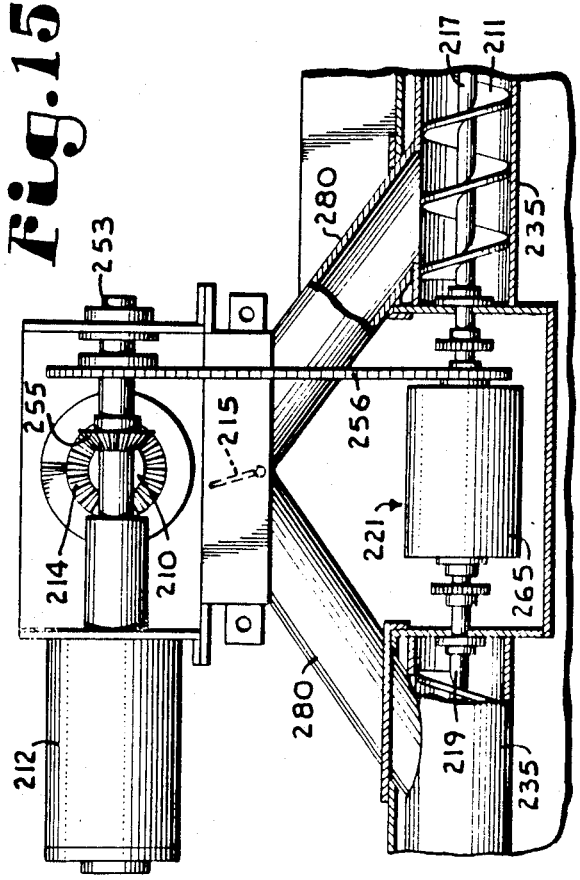

FOLDABLE DRILL IMPLEMENT WITH DIFFERENTIAL ASSEMBLY

CROSS-REFERENCE TO RELATED APPLICATIONS

The present application is a continuation-in-part of U.S. patent application of Ser. No. 816,556, filed Jan. 6, 1986, entitled FOLDABLE DRILL IMPLEMENT, now abandoned; which was a continuation of U.S. patent application Ser. No. 574,264, filed Jan. 26, 1984, and titled FOLDABLE DRILL IMPLEMENT, now U.S. Pat. No. 4,562,779.

BACKGROUND OF THE INVENTION

This invention relates to seed planting and fertilizer spreading implements in general and particularly to such implements having augers for distributing seed and fertilizer.

It is desirable to route seed grain from a central hopper and continuously supply secondary hoppers spaced from the central hopper for transferring the seed grain to individual planters. Typically, planter systems in general have utilized auger arrangements with a plurality of small hoppers or boxes are located adjacent planter drills. This arrangement generally requires extensive stopping and starting operations for a farmer/operator to refill the small hoppers from a central storage facility or transport truck. Moreover, some operators use a heavy, complex arrangement of augers which tends to increase the cost and is subject to a high degree of maintenance.

In an effort to eliminate the above problem, certain devices have utilized the so-called air distribution system, which has a central hopper with a network of air hoses acting as fluid conveyors to transport material from the central hopper to the drills. An air system requires an inordinate amount of power, due in part to the dozens of individual hoses through which seed is distributed. The air hoses are cumbersome, tend to snarl and tangle, and are susceptible to clogging. Furthermore, the air distribution system utilizes plastic hoses that tend to split and require maintenance. Clogging is a problem because of the narrow inner diameter of the hoses, particularly at bends, thus necessitating a high amount of maintenance by the farmer or operator. Furthermore, typical air systems regulate the flow of material by controlling discharge from a large central hopper, instead of near the remote planter drills, which is more accurate.

It is also desirable to achieve a constant planting depth for the seeds. The planting depth is dependent on the depth to which a furrow is dug in the soil. If the seeds are planted at the proper depth, it is more likely that they will receive the proper amount of moisture and fertilizer, thus improving the chances for a good crop. If seeds are planted to deep, they will germinate, but will not be able to reach the ground surface and will consequently die. If the planting depth is too shallow, the seed may not get enough moisture to allow germination.

There are various problems associated with maintaining a constant planting depth. Most fields which are to be planted have an undulating terrain and the soil is of varying degrees of hardness. These and other factors can affect the depth to which a furrow opener extends into the field, resulting in inconsistent and improper planting depths. This problem is compounded by the use of a number of individual hoppers situated above the furrow openers. As the seed is planted, the weight in the hopper is lessened, thereby applying unequal pressure to the furrow openers and associated press wheels.

It is also advantageous to provide a farm implement that has extension sections that can be folded upwardly for transport and storage. However, some systems that use small individual seed hoppers cannot be folded unless the hoppers are nearly empty. Thus, unless the operator can accurately estimate the amount of seed to be used on a particular field, the hoppers may have to be manually emptied prior to transportation to another field.

If excess seed or fertilizer accumulates in a secondary hopper or drill box, the seed may be damaged and the fertilizer may clump together. Attempts to provide adequate amounts of seed and fertilizer without providing an excess amount that can be damaged, have not been fruitful. In addition to seed damage, the distribution system can be damaged if excess seed accumulates. The mechanical drivers can jam or break as a result of build-up of seed or fertilizer, which places an excessive load on the mechanism. Previous efforts to accurately control against build-up of excess material have also not been successful.

Furthermore, it is desirable to have a drill feed system that can be utilized with other farm implements, such as standard cultivators.

The present invention provides a foldable drill implement having a supply hopper mounted on a center frame section. A broadcast hopper is spaced from the supply hopper and mounted on the center frame section and extends onto wing frame sections. The supply hopper and the broadcast hopper are connected by various augers that distribute materials, such as seed and fertilizer, to be planted. The augers maintain a level of fill in the broadcast hopper, and recycling augers return accumulated excess material from outer ends of the broadcast hopper for redistribution to planter drills. The wing sections fold relative to the center frame section and utilize swing plates and spacer plates to dampen oscillation of the wing sections. Controls regulate flow of material by sensing accumulated excess material and deactuating the augers.

OBJECTS OF THE INVENTION

The principal objects of the present invention are: to provide an implement for planting seed; to provide such an implement which can also be utilized to spread fertilzer; to provide such an implement which can route seed grain from a supply hopper continuously to a broadcast hopper removed therefrom for feeding seed planters; to provide such an implement which allows a seed planter to deposit seed at a constant depth as the implement moves over undulating terrain; to provide such an implement having seed planters with independent suspension; to provide such an implement which maintains relatively constant weight on the seed planters; to provide such an implement which has remote wing frame sections with wing drill boxes which are foldable for transportation; to provide such an implement with wing frame sections which are connected to a center frame section of the implement by a pivot to accommodate the undulating terrain; to provide such an implement which regulates an amount of seed and fertilizer in the broadcast hopper and wing drill boxes; to provide such an implement which has recycling means for redistributing excess seed; to provide such an implement which can be utilized with other farm implements, such as a cultivator; to provide such an implement having a differential assembly for dividing the torque equally between two or more broadcast augers; and to provide such an implement which is relatively easy to manufacture and maintain in working order, durable in use, and well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, top plan view of a foldable drill implement according to the present invention.

FIG. 2 is a side elevational view of the drill implement.

FIG. 3 is a fragmentary, rear elevational view of the drill implement.

FIG. 4 is an enlarged, fragmentary side elevational view of the present invention showing supply and distribution augers and return augers, with portions broken away.

FIG. 5 is an enlarged, cross-sectional view of the drill implement taken along lines 5—5, FIG. 4.

FIG. 6 is an enlarged, fragmentary top plan view of the present invention with portions broken away to show interior detail.

FIG. 7 is an enlarged, elevational view taken along lines 7—7, FIG. 6 with portions broken away.

FIG. 8 is an enlarged, cross-sectional view taken along lines 8—8, FIG. 6.

FIG. 9 is an enlarged, fragmentary, cross-sectional view taken along lines 9—9, FIG. 6.

FIG. 10 is an enlarged, cross-sectional view taken along lines 10—10, FIG. 4.

FIG. 11 is an enlarged, fragmentary top plan view of the present invention showing a pivot connection between a broadcast hopper and a wing drill box, with portions broken away.

FIG. 12 is an enlarged, cross-sectional view taken along lines 12—12, FIG. 11.

FIG. 13 is a schematic diagram of an alternate embodiment of the present invention, showing first and second material flow patterns.

FIG. 14 is a fragmentary top plan view of an alternative embodiment of the present invention showing a broadcast hopper and wing drill box, with portions broken away to show interior detail.

FIG. 15 is an enlarged, fragmentary front elevational view of a differential assembly driving two broadcast augers, with portions broken away.

FIG. 16 is an enlarged, fragmentary view of the differential housing, with portions broken away.

DETAILED DESCRIPTION OF THE INVENTION

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more in detail to the drawings:

The reference numeral 1, FIG. 1, generally indicates a foldable drill implement 1 having an implement frame 2 with a tow bar 3 for connection to a prime mover (not shown) and a plurality of ground-engaging wheels 4. A supply hopper 7 and a broadcast hopper 8 are mounted to the implement frame 2. The broadcast hopper 8 is spaced from the supply hopper 7 and extends generally transversely to the frame 2 and onto a wing frame section 9. A first supply auger 10, supported by the frame 2, connects the supply hopper 7 and the broadcast hopper 8 and provides flow communication therebetween. A first distribution auger 11 is supported by the frame 2 and extends the length of the broadcast hopper 8. The first distribution auger 11 is in flow communication with the first supply auger 10 for transferring material from the supply hopper 7 to the broadcast hopper 8 and maintaining a level of fill in the broadcast hopper 8. Motive means 12 are provided to drive the augers. A plurality of planter means 13 are mounted to the frame 2 in flow communication with the first distribution auger 11 for planting the material. The wing frame section 9 is connected to a center frame section 16 by pivot means 18 for folding.

Recycling means 20 are used to return accumulated excess material from the broadcast hopper 8 to the first supply auger 10 for redistribution to the planter means 13.

Control means 22 provide an alternative to recycling means 20. The control means 22 sense accumulated excess material and are designed to stop, and regulate, flow of material to eliminate the accumulation.

The terms "upwardly", "downwardly", and common derivatives thereof have the same meaning as shown in the drawings. The term "forward" and derivatives thereof mean in the direction of the bottom of the page with respect to the view of the implement 1 seen in FIG. 1 (i.e., toward the tow bar 3) and the term "rear" and derivatives thereof have the opposite meaning.

In the illustrated example, FIG. 1, the implement frame 2 has the center frame section 16 and a plurality of wing frame sections 26 and 27, which are oppositely positioned adjacent the center frame section 16. Each wing frame section 26 and 27 has a ground-engaging wheel 28 connected to and supporting a respective wing frame section 26 and 27.

The tow bar 3 is located at a forward portion of the center frame section 16 and connects to a prime mover, such as a farm tractor or the like, which is not shown.

The implement frame 2 is supported by relatively large ground-engaging wheels 4 that are connected to the center frame section 16. These wheels 4 may be allowed to caster freely, or may be locked in the position shown in FIG. 1.

The supply hopper 7 is mounted on the center frame section 16. The weight of the supply hopper 7 is carried by the large wheels 4 and partly by the prime mover. As illustrated, the supply hopper 7 has a first compartment 31 for storing a first material, such as a seed grain (not shown). The supply hopper 7 also has a second compartment 32 for storing a second material, such as fertilizer (not shown). As illustrated, the supply hopper 7 has a divider 34 that separates the first compartment 31 from the second compartment 32. It is envisioned that the first compartment 31 and second compartment 32 could be separate supply hoppers. The divider 34 illustrated herein can be moved to vary the relative capacities of the first and second compartments 31 and 32.

The first and second compartments 31 and 32 have respective openings 37 and 38, which allow the stored material to exit. The supply hopper 7 has a cover 40, which is removable for access to the interior of the supply hopper 7, such as when filling the first end second compartments 31 and 32.

The broadcast hopper 8 has a central drill box 43 mounted to the center frame section 16. The central drill box 43 is mounted rearwardly of and spaced from the supply hopper 7. As illustrated, the central drill box 43 extends generally transversely to the center frame section 16. Thus, the central drill box 43 is disposed generally transversly to a path of the drill implement 1 as it traverses a field. This path defines a first direction of movement of the drill implement 1.

The wing frame sections 26 and 27 are connected to the center frame section 16 on opposite sides of the central drill box 43 and extend generally longitudinally thereof. The broadcast hopper 8 has respective wing section drill boxes 46 and 47 mounted on the wing frame sections 26 and 27. The wing section drill boxes 46 and 47 are connected to the central drill box 43 such that there is flow communication between each of the wing section drill boxes 46 and 47 and the central drill box 43, as shown in FIG. 6.

The central drill box 43 and the wing section drill boxes 46 and 47 are of substantially similar construction. Accordingly, the central drill box 43 and wing section drill boxes 46 and 47 will be described in similar terms. Differences will be pointed out when necessary. Each of the central and wing section drill boxes has a bottom 49 defining a plurality of outlets 50 therethrough to allow metering of seed, fertilizer or the like from the broadcast hopper 8 to the planter means 13. A removable lid 52 is provided for each drill box. As illustrated, each drill box has a partition 54 extending the length of the drill box. The purpose of the partition 54 is explained below.

The planter means 13 are connected to the central drill box 43 and the wing section drill boxes 46 and 47 and are in flow communication therewith for broadcast of the seed, fertilizer or the like. The planter means 13 include a boot 57, as is well known in the art, connected to the central and wing section drill boxes 43, 46 and 47. A plurality of boots 57 are provided, one for each drill box outlet 50, for flow communication therethrough. As stated, planter boots 57 are well known in the art and a detailed description is not provided. However, it is pointed out that each boot 57 has a metering wheel 58 as seen in FIG. 8. Typically, a metering wheel 58 is used for dispensing seed, fertilizer or the like. The metering wheel 58 has a plurality of recesses 60 therein for receiving and transferring the material to be planted.

Each of the metering wheels 58 has a respective drive shaft 62 connected to drive means (not shown) for rotating the wheels 58. Typically, the drive means (not shown) are connected to a wheel 4 and the rate of drive shaft rotation is proportional to the rotation of the wheel 4. Consequently, the rate of material dispensing, such as seed and fertilizer dispensing, is related to the rotation of the wheel 4 and, therefore, the ground speed of the implement 1.

As illustrated, the drill box partition 54 divides the drill boxes into a first bin 66 for receiving a first material, such as seed, and a second bin 67 for receiving a second material, such as fertilizer, as seen in FIG. 8. Each bin 66 and 67 has a plurality of the drill box outlets 50 therethrough with connecting planter boots 57. Each planter boot 57 opens downwardly into a material tube 70 for discharge of the material stored in the respective bin 66 and 67.

Each material tube 70 from the first bin 66 corresponds to a material tube from the second bin 67 and these "pairs" of tubes 70 extend from their respective boots 57 to a respective furrow opener 72. Each furrow opener 72 has a ground-engaging tip 73. The furrow openers 72 are of standard design and are connected to the implement frame 2 by biasing means, such as springs 74, which serve to continuously urge the furrow openers 72 into ground engagement during operation. In the illustrated example, see FIG. 2, the furrow openers 72 are in an elevated position for purposes of description.

The individual furrow openers 72 are spaced longitudinally along the center frame section 16 associated with the central drill box 43 and along the respective wing frame section 26 and 27 associated with the wing section drill boxes 46 and 47. The furrow openers 72 are staggered in forward and rearward positions in an alternating arrangement along the length of the drill boxes 43, 46 and 47. Each furrow opener 72 has an associated press wheel 75 for tamping the planter material into the ground.

The first supply auger 10 is carried by the implement frame 2 and extends between the supply hopper 7 and the broadcast hopper 8. As illustrated, the first supply auger 10 has a first end 78 and a second end 79. The first supply auger 10 extends through a supply tube 80 and has conventional coreless auger flighting 81. The first supply auger is coreless and fabricated from a flexible material so that it may bend during operation, as seen in FIG. 4. The first end 78 of the first supply auger 10 is connected to a support member 84 so as to be free to rotate. A short shaft 82 is connected by clamp 83 to the coreless auger flighting 81 to provide rotation of the coreless auger flighting 81. The supply tube 80 has a central portion fabricated of a rubber hose 87 which allows bending of the first supply auger 10 during transportation of the implement 1.

The supply tube 80 is open at a juncture 85 to the first supply hopper compartment opening 37, as seen in FIGS. 4 and 5, for receiving material by gravity flow from the first compartment 31. The first supply auger 10 is connected to the central drill box 43 near a middle portion 86 thereof. The first supply auger second end 79 is supported by the center frame section 25 and is operably connected to the motive means 12. The first supply auger second end 79 has a similar shaft 82 and clamp 83 connected to the coreless auger flighting 81 for providing rotational movement thereof.

The coreless auger flighting 81 ends near a pair of connecting tubes 88. These connecting tubes 88 provide flow communication by gravity flow between the first supply auger 10 and the first distribution auger 11. Material is transferred from the supply tube 80 through an opening in the bottom of the supply tube 80. The relative amount of material that is transferred from the supply tube 80 to a respective connecting tube 88 can be regulated by lateral movement of the first supply auger 10. The second end 79 thereof may be positioned to the left or the right of the location shown in the drawings.

The first distribution auger 11 is carried in the central drill box 43, situated in the first bin 66, and has right and left hand opposed standard flighting 89 carried on a core 91 for transporting material outwardly from the middle portion 86 of the central drill box 43. As illustrating in FIG. 9, the first distribution auger 11 extends through a delivery tube 90 which is open to the connecting tubes 88 for receiving material from the first supply auger 10. Motive means 12 are provided to drive the first distribution auger 11 as shown in FIG. 9.

The delivery tube 90 has a series of openings 92 therethrough for passage of the material into the first bin 66 of the central drill box 43. These openings 92 generally corresponding to the respective planter boots 57 in the first drill box bin 66. It is noted that the delivery tube 90 is desirable, but not required, for operation of the present invention.

The central drill box 43 has outer ends 95 and 96. The first distribution auger 11 extends the length of the central drill box 43, to the outer ends 95 and 96. The wing section drill boxes 46 and 47 are of substantially similar design and each has a respective first wing distribution auger 98 located within respective first bins 101 of the wing section drill boxes 46 and 47. The first wing distribution augers 98 receive material from outer ends of the first distribution auger 11 and have a construction similar thereto.

The first wing distribution augers 98 each extend through a respective wing delivery tube 103 having openings therealong for passage of material into the first wing section bins 101.

Opposite outer ends of the first distribution auger 11 are connected to the respective first wing distribution augers 98 by a universal joint 110, which allows the wing section drill boxes 46 and 47 to rotate with respect to the central drill box 43, while maintaining synchronous rotation of the distribution augers 11 and 98. The delivery tubes 90 and 103 are connected by a flexible rubber hose 112 which surrounds the universal joint 110 and also allows for folding.

The recycling means 20 include a pick up arrangement 115 and duct means 116 for transferring excess material from near the outer ends of the wing section drill boxes 106. Excess material tends to accummulate at these outer ends 106, and the recycling means 20 return the accumulated excess material toward the first supply auger 10 for redistribution.

As illustrated, the recycling means 20 include oppositely positioned wing broadcast recycling augers 118 in flow communication with a central broadcast recycling auger 120. The recycling augers 118 and 120 have left and right hand flighting 89 and core 91 as appropriate for transferring material toward the middle portion 86 of the central drill box 43. The wing broadcast recycling augers are situated in the first bins 101 of the wing section drill boxes 46 and 47, respectively. The central broadcast recycling auger is situated in the central drill box 43, specifically in the first bin 66. Each of the broadcast recycling augers 118 and 120 extend through respective return auger tubes 122. The wing broadcast recycling augers 118 are connected to the central broadcast recycling auger by universal joints (not shown), which are substantially similar in design to the universal joint 110. Also, the rubber hose 112 is used to connect the return tubes 122. The broadcast recycling augers 118 and 120 are connected to and driven by the motive means 12.

The pick up arrangement 115 includes openings 124 at respective outer ends of the wing delivery tubes 103. The wing return tubes 122 have respective openings 125 at outer ends thereof in flow communication with the wing delivery tube openings 124, providing flow communication between the distribution augers and the return augers (see FIG. 6).

The recycling duct means 116 also include a supply recycling auger 127 extending through a return tube 128 and having a coreless auger construction similar to the first supply auger 10. The supply recycling auger has a first end 129 and a second end 130. The first end 129 is connected to the motive means 12. The supply recycling auger 127 receives material by gravity flow from the central broadcast recycling auger 120 through two similar drop tubes 132 located near the supply recycling auger first end 129, as illustrated in FIGS. 4 and 10.

The supply recycling auger second end 130 is situated generally above the first supply auger first end, as seen in FIGS. 4 and 5. A redistribution drop tube 133 openly connects the supply recycling auger 127 and the first supply auger 10 for transfer of material by gravity flow therebetween.

The redistribution drop tube 133 connects the supply auger 10 and the supply recycling auger 127 at a point forward of the juncture 85 between the first compartment opening 37 and the first supply auger 10.

In the illustrated example, dual second supply augers 140 are provided and connect the second hopper compartment 32 and the second bin 67 of the central drill box 43. As seen in FIG. 5, a first end 141 of each second supply auger is in flow communication with the second compartment 32 through the second compartment opening 38.

A second end 142 of each second supply auger 140 is supported by the central drill box 43 and is connected to the motive means 12. A second distribution auger 145 includes dual second distribution augers 147 and oppositely positioned second wing distribution augers 148 and 149.

The dual second supply augers 140 and the second distribution auger 145 are substantially similar to the first supply auger 10 and the first distribution auger 11 in construction, except as otherwise noted. Each of the dual supply augers 140 has a respective connecting tube 151 providing gravity flow communication between the second supply augers and the respective dual second central distribution augers 147, as seen in FIG. 7. Additionally, the dual second central distribution augers 147 have separate motive means 12.

Also, the second auger system does not include recycling means 20, although it is contemplated that recycling means 20 could be utilized with a second auger system.

Furthermore, it is contemplated that the first supply and distribution auger arrangement could be made in a similar dual manner to that of the second supply and distribution auger arrangement. In that case, the recycling means 20 would not be utilized with the first supply and distribution auger arrangement. The flow patterns associated with this configuration are shown in FIG. 13.

It is also envisioned that multiple outer wing frame sections, with concomitant planting and distributing and return auger structure, could be utilized. Thus, two (or more) wing frame sections can be used on either side of the central drill box 43 to increase the coverage of the planting system by increasing the width of the implement 1.

The second distribution auger 145 includes the control means 22 for sensing an accumulation of excess material in the second bins 67 of the drill boxes. The control means 22 is connected to the motive means 12 and has a sensor 154, such as a trip arm 155, that senses an accumulation of excess material at outer ends 106 of the wing section drill boxes 46 and 47. The trip arm 155 is connected to a control switch 156 which in turn is connected to the motive means 12 for deactuating the motive means 12 that drive the second supply auger 140 and the second distribution auger 145. Specifically, a clutch (not shown), such as an electric clutch, associated with the motive means 12 is disengaged upon tripping of the sensor 154.

As seen in FIG. 5, the supply hopper openings 37 and 38 are equipped with movable gates 160 which control the amount of material released from the first and second compartments 31 and 32. The movable gates 160 are actuated by an adjusting screw 161 which is held in place by appropriate support members 162.

The motive means 12 may include a hydraulic motor system, an electrical motor system, or simple mechanical gearing connections between the wheels and the various augers. It is desirable, however, to key the rotation of the augers relative to the ground speed of the implement and associated prime mover. A series of reduction gears 165 is shown in FIG. 2. Such gears 165 may be used with a hydraulic motor or various chain arrangements to drive the augers at a speed of rotation that is relative to the ground speed. The motive means further include gears and chains, as illustrated in FIG. 7.

The pivot means 18 include the universal joints 110 described above, which allow upward and downward movement of the distibution augers. The pivot means 18 permit folding of the wing frame sections 26 and 27 relative to the center frame section 16, as shown in FIG. 3. The pivot means also permit certain play, or oscillation, between the center frame section 16 and the wing frame sections 26 and 27. A respective spacer plate 169 is connected to each of the outer ends of the center frame section 16 and to each of the central drill box outer ends 95 and 96. A swing plate 171 is held between the spacer plate 169 and the respective central drill box outer end 95 and 96. The spacer plate allows oscillation of the swing plate 171, while restraining outward movement thereof. Each swing plate 171 has a pair of hinge plates 173 connected thereto and extending outwardly therefrom and through an opening 174 in the spacer plate 169. Corresponding hinge plates 176 are attached to the wing frame sections 26 and 27. Respective central hinge plates 173 and wing hinge plates 176 are connected by hinge pins 178 which allow rotational movement, or folding, between the center frame section 16 and the wing frame sections 26 and 27. Conventional hydraulic rams 180 are provided to actuate the folding operation. The various augers extend through the spacer plate opening 174.

The broadcast hopper 8 and associated frame structure, are rotated upwardly out of ground engagement by conventional hydraulic rams (not shown) for transport. As seen in FIG. 4, the first and second supply augers 10 and 140, as well as the supply recycling auger 127 have rubber hose 87 connections which allow the rotation discussed above.

A plurality of baffle plates 183 are situated in the wing section drill boxes 46 and 47. The baffle plates 183 inhibit shifting of the first and second materials, such as seed, fertilizer or the like, during the folding operation.

The drill implement 1 is constructed to be connected to a conventional cultivator apparatus 190 having a plurality of ground engaging tools, such as coil tines 191. The cultivator apparatus 190 is connected to the tow bar 3 and is positioned forwardly of the planter means 13 for tilling the ground prior to planting. However, the drill implement 1 is operable without the cultivator 190 in combination therewith.

In use, the foldable drill implement 1 is connected by the tow bar 3 to a prime mover, which is not shown. As illustrated, a relatively large quantity of seed grain is placed in the supply hopper first compartment 31, upon temporary removal of the supply hopper cover 40. Fertilizer is placed in the second compartment 32. The seed flows, by gravity flow, through the first compartment opening 37 and past the regulating movable gate 160 into the supply tube 80 for rearward transfer by the first supply auger 10. The direction of travel is shown in FIGS. 1, 4 and 6. The seed drops from the first supply auger 10 through the connecting tubes 88 into the delivery tube 90 containing the first distribution auger 11. The seed is transferred laterally through the delivery tube 90 with portions of the seed dropping into the first bins 66 and 101 for subsequent planting through the planter means 13.

As illustrated, the fertilizer flows, by gravity flow, from the second compartment 32 through the opening 38 past the movable gates 160. The fertilizer drops into the dual second supply augers 140 with associated supply tubes 80 for transfer rearwardly to the center frame section 16. The fertilizer flows through connecting tubes 151 into the respective second distribution augers 145. The fertilizer drops through the series of openings in the distribution augers tubes into the second bin 67 associated with the central drill box 43 and wing section drill boxes 46 and 47. The fertilizer is then fed into the material tubes 70 past the metering wheel 58 for deposition into the ground.

The supply augers and distribution augers are regulated by the motive means 12 and the movable gates 160 to maintain a desired level of fill within the respective seed and fertilizer bins. In practice, a 15% excess of seed and fertilizer has been found to be desirable. This maintained fill level provides for generally constant weight to be applied to the planter means 13. Thus, a constant planting depth is obtained.

However, it is possible for the excess material to accumulate at the outer ends of the wing section drill boxes because the movable gates 160 provide only rough control of the flow, to within about 1 percent. This accumulated excess material can present problems such as cracking of the seed and clumping of the fertilizer and jamming or breaking of the augers due to the increased load. The recycling means 20 and control means 22 serve to alleviate the problems associated with accumulated excess material.

The recycling pick up arrangement receives excess seed at the outer ends 106 of the wing section drill boxes 46 and 47 once the level of fill reaches the opening 125 in the wing return tube 122.

The flow pattern of the excess seed is shown in FIG. 6. The excess seed travels within the return tubes 122 to the central drill box 43 and flows into the supply recycling auger through the recycling drop tubes 132, FIG. 10. The seed then flows forwardly toward the supply hopper 7 and is raised to an elevated position as seen in FIG. 4, prior to discharge through the redistribution drop tube 133 into the supply tube 80 of the first supply auger 10. The seed is deposited in the supply tube 80 at a position forward of the juncture 85 between the first compartment 31 and the first supply auger 10. Thus, a certain amount of seed is already within the supply tube 80 when seed is flowing from the first compartment 31. A corresponding lesser amount of seed will flow from the first compartment 31 due to the presence of this redistribution seed, thereby conserving seed.

The control means 22, including the sensor 154, such as trip arm 155, and control switch 156, provides fine control over the amount of excess material in the drill boxes. Whereas the movable gates provide only rough control of the flow, the control means deactuates the supply and distribution augers so that no material flows until the accumulated excess material is depleted by planting. This system maintains to a close degree the right amount of grain or fertilizer being fed into the drill boxes. The combination of the control means and the movable gates gives the operator/farmer fine control over the planting operation.

As shown in FIG. 3, the wing frame sections 26 and 27 may be folded upwardly for transport. The baffle plates 183 act to inhibit all of the seed or fertilizer from moving downwardly during transportation.

ALTERNATIVE EMBODIMENT OF THE INVENTION

An alternative embodiment of a foldable drill implement 201 is shown in FIGS. 14, 15 and 16. The implement 201 is substantially similar to the foldable drill implement 1 in terms of the provision of an appropriate implement frame, ground-engaging wheels, supply hopper, a plurality of wing frame sections, etc. which are not shown in FIGS. 14 through 16. A central drill box 243 is carried by a center frame section 216. A wing frame section 227 is pivotally connected to the center frame section 216 by central hinge plates 273, 275, and hinge pins 278. A wing section drill box 247 is carried on the wing frame section 227.

For purposes of clarity, certain of the components that make up the supply and distribution system are not shown in the drawings, particularly FIG. 14, which does not show supply augers, drill box partitions, etc. which are shown in the preceding drawings and are included in the present invention.

A first supply auger 210 is illustrated in FIG. 15, and specifically a distal end beveled gear 214 is shown. A first distribution auger 211 is carried in the central drill box 43 and has a right side auger shaft 217 and a left side auger shaft 219, as seen in FIG. 15. The right and left side auger shafts 217 and 219 have right and left hand opposed standard flighting carried thereon for transporting material outwardly from a middle portion of the central drill box 243. The first distribution auger 211 extends through a delivery tube 290, which is open to connecting tubes 280 for receiving material, such as seed, from the first supply auger 210. The delivery tube 290 is substantially similar to the previously described delivery tube 90. The connecting tubes 280 are divided by a baffle 215 for rough adjustment of distribution of material to the left and right sides of the first distribution auger 211. The first distribution auger 211 extends the length of the central drill box 243.

A first differential assembly 221 connects the left and right side auger shafts 217 and 219.

A second supply auger (not shown) supplies material to a second distribution auger 223, and is used to transport a second material, such as fertilizer, to the planter means, as described for the first embodiment. A second differential assembly 224 connects left and right side auger shafts of the second distribution auger 223.

For purposes of the alternative embodiment, the following description of the first distribution auger 211, first differential assembly 221, and the related components as will be described, likewise applies to the second distribution auger 223 and second differential assembly 224. That is, the second differential assembly 224 operates substantially similar to the first differential assembly 221; thus, only the first distribution assembly 221 need be described.

A first wing distribution auger 225 is located within the wing section drill box 247 and extends the length thereof. Referring to FIG. 14, and as opposed to the first embodiment, an outer end 229 of the right side auger shaft 217 stops at an outer end of the central drill box 243. An inner end 230 of the first wing distribution auger 225 begins at an inner end of the wing section drill box 247. A rubber hose 233 connects the outer end of the central drill box 243 to the inner end of the wing section drill box 247, and specifically connects delivery tubes 235 associated with the first distribution auger 211 and the first wing distribution auger 225, providing flow communication between the drill boxes. It has been found to be difficult to run material effectively through the rubber hose 112 described in the previous embodiment when the universal joint 110 is disposed therein. Thus, the rubber hose 233 is clear of other components.

To power the first wing distribution auger 225, a first wing drive assembly 236 is provided. The right and left side auger shafts 217 and 219 have respective drive gears 239 carried thereon. The first wing drive assembly has a proximal gear 241 carried on a central drive shaft 242, which proximal gear 241 mesh as with, and receives power from the right side drive gear 239.

It is noted that the first wing drive assembly 236, since it is driven by the drive gear 239 on the right side auger shaft 217, is also affected by the first differential assembly 221.

The central drive shaft 242 runs generally parallel in the central drill box 243 to the first distribution auger 211. An outer end of the central drive shaft 242 is attached to one side of a first U-joint 244 between the central drill box 243 and the wing section drill box 247, adjacent the rubber hose 233.

Connected to another side of the first U-joint 244 is a wing drive shaft 245. An outer end of the wing drive shaft carries a distal gear 248, which meshes with and drives a wing gear 251 on the first wing distribution auger 225, thereby driving the first wing distribution auger 225.

A hydraulic motor 212 provides motive means for the first supply auger 210, the first distribution auger 211 and the first wing distribution auger 225. An output shaft 253 extends from the hydraulic motor 212 and carries a beveled gear 255 thereon for driving the first supply auger bevel gear 214. A chain drive assembly 256 connects the output shaft 253 to the first differential assembly 221, for driving same.

The chain drive assembly 256 includes a drive sprocket 261, which is attached to a right side bearing 263. The right side bearing 263 forms a part of the first differential assembly 221. The right side auger shaft 217 extends through the right side bearing 263, but the right side bearing 263 is not keyed to the right side auger shaft 217. Thus, their rotations are not directly dependent on one another. The left side auger shaft 219 extends through a left side bearing 264, which is not keyed to the left side auger shaft 219.

The differential assembly 221 includes a differential housing, or spider, 265. The right and left side bearings 263 and 264 are attached to the housing 265 such that the three units revolve together about the right and left side auger shafts 217 and 219. Two bevel pinions 268 are located within the housing 265 and are free to revolve around a locked pinion shaft 269, which extends across the interior of the housing 265. Thus, the bevel pinions 268 have a coincidental axis through the pinion shaft 269 that is radial to an axis of the right and left side auger shafts 217 and 219.

Respective right and left side inner ends 276 and 277 of the right and left side auger shafts 217 and 219, respectively, extend into the interior of the housing 265. Right and left side master gears 293 and 294 are keyed to the right and left side auger shaft inner ends 276 and 277, respectively, and are positioned to mesh with the bevel pinions 268.

Control means 222 are provided for sensing an accumulation of excess material and the drill boxes 243 and 227. It is envisioned that a grain level switch such as described above for the previous embodiment as including a sensor 154, such as a triparm 155, for sensing an accumulation of excess material at outer ends of the wing section drill boxes, could be provided. In the present embodiment, switches are provided at outer ends of both wing section drill boxes for deactuating the hydraulic motor 212, but only when both of the grain level switches are activated, as by depression due to an overabundance of material in the drill box. Specifically, a clutch associated with the hydraulic motor 212 could be used to disengage the hydraulic motor 212. A time delay means is provided to prevent the system from cycling on and off too often.

In use, the first differential assembly 221 works in a manner known in the art, which will be described. A description of the utilization of the first differential assembly 221 in the present invention follows.

The housing 265 receives power from the hydraulic motor 212 through the chain drive assembly 256, specifically the drive sprocket 261 and bearings 263 and 264. Thus, as the drive sprocket 261 turns about the left and right side auger shafts 217 and 219, so do the bearings 263 and 264, the housing 265, and the bevel pinions 268. When no torque differential is present between the left and right side auger shafts 217 and 219, or the central or wing drive shafts 242 and 245 associated with driving the first wing distribution auger, the bevel pinions 268 revolve with the housing 265, without turning about the pinion shaft 269. As the bevel pinions 268 turn, they mesh with the right and left side master gears 293 and 294, turning them, but without any motion relative to each other. Thus, the right and left side master gears turn in unison, resulting in unified turning of the right and left side auger shafts 217 and 219, the central drive shafts 242, and the wing drive shafts 245.

However, when a torque differential exists, a shaft with a higher torque will rotate at a slower speed, with the difference in rotation of the right and left side auger shafts 217 and 219 (and associated central and wing drive shaft) is compensated for by rotation of the bevel pinions 268 about the pinion shaft 269. Any accelerated motion of one drive shaft is offset by a retarded motion of the other drive shaft, when comparing the right side to the left side.

In the present situation, seed or fertilizer is augered back to the distribution auger 211 to a point approximately one foot above the distribution auger 211. It is at this point that the material is released into the connecting tubes 280, being divided by the baffle 215, so that roughly one-half will go down each side of the connecting tubes 280.

However, only rough division of the material can be accomplished through use of the baffle 215, so it is not possible to divide the material such that exactly half goes to each side. If either the right or left side of the distribution auger 211, 219 accumulates excess material, it will eventually cause more torque on that side, which causes it to slow, and acting through the differential, allows the other side to speed up proportionately. If one side of the distribution auger 211 and wing distribution auger 225 fills up to the end of the wing distribution auger 225, the auger will stop completely, causing the other side to speed up to exactly twice its normal speed. Eventually, material on the other side will reach the end, and it will put pressure on the other grain level switch. When both of the grain level switches are pressed, the hydraulic motor 212 shuts down, which turns off both the first supply auger 210 and the first distribution auger 211. The system stays off until one of the grain level switches is freed through distribution, by planting, of the accumulated excess material.

Due to the time delay means associated with the grain level switches, the system cannot cycle too often, and a time delay of approximately ten to twenty seconds has been found to be adequate. The first differential assembly 221 is very sensitive to even a small amount of torque differential, such that constant adjustments in speed of the right and left side augering systems is accomplished.

It is pointed out that increased torque on the first wing distribution auger 225 also affects the first differential assembly, since the increased torque is transferred through the wing central drive shafts 245 and 242 to the right or left side auger shaft 217, 219 as the case may be.

It is to be understood that while certain forms of the present invention have been illustrated and described herein, it is not to be limited to the specific forms or arrangement of parts described and shown.

What is claimed and desired to be secured by Letters Patent is as follows:

1. A foldable drill implement comprising:
   (a) an implement frame having a tow bar for connection to a prime mover and a plurality of ground-engaging wheels for movable support over the ground in a first direction;
   (b) a supply hopper mounted to said frame;
   (c) a broadcast hopper mounted to said frame and spaced from said supply hopper, and extending generally transversely to said first direction;
   (d) said implement frame having a center frame section and a plurality of wing frame sections oppositely positioned adjacent said center frame section and having ground-engaging wheels for support, said center frame section including pivot means connecting said wing frame sections to opposite ends of said center frame section for folding;
   (e) said broadcast hopper including a central drill box mounted on said center frame section;

(f) said broadcast hopper including a plurality of wing section drill boxes mounted on a respective said wing frame section and extending generally longitudinally of said central drill box and in flow communication therewith, each of said wing section drill boxes having outer ends;

(g) a plurality of planter means supported by said frame and disposed along said broadcast hopper, said broadcast hopper being in flow communication with said planter means for broadcast of said material in the ground upon operational movement of said implement frame;

(h) a first supply auger supported by said frame and extending generally in said first direction, said first supply auger being connected to said supply hopper and to said broadcast hopper and being in flow communication therebetween;

(i) a first distribution auger supported by said frame and extending generally transversely to said first direction along said broadcast hopper, said first distribution auger being in flow communication with said first supply auger and adapted to transfer material from said supply auger to said central and wing drill boxes of said broadcast hopper; said first distribution auger having a right side auger shaft and a left side auger shaft;

(j) motive means connected to and driving said first supply auger and said first distribution auger;

(k) a differential assembly connected to said motive means for receiving power therefrom; said differential assembly connecting said right and left side auger shafts and differentially supplying power thereto in response to torque differentials applied to said right and left side auger shafts; and (l) control means at said wing section drill box outer ends and sensitive to the presence of excess material delivered by respective said wing distribution augers, said control means being adapted to deactuate said first supply and distribution augers upon said presence of said excess material.

2. The drill implement as set forth in claim 1 wherein said differential assembly includes:

(a) a housing rotatably connected to said right and left side auger shafts and being separately rotatable in relation thereto;

(b) a bevel pinion received in said housing and turnable about an axis radial to an axis extending through said right and left side auger shafts;

(c) a right side master gear attached to an inner end of said right side auger shaft and received within said housing; said right side master gear being connected to said bevel pinion and meshable with said bevel pinion;

(d) a left side master gear attached to an inner end of said left side auger shaft and received within said housing; said left side master gear being connected to said bevel pinion and meshable therewith, whereby torque differentials between said right and left side auger shafts are transmitted through said differential assembly for differentially affecting the speed of rotation of the right and left side auger shafts with respect to each other such that an accelerated motion of one of said right and left side auger shafts having a lesser amount of torque applied thereto is offset by a retarded motion of the other of said right and left side auger shafts having relatively more torque applied thereto.

3. A foldable drill implement comprising:

(a) an implement frame having a tow bar for connection to a prime mover and a plurality of ground-engaging wheels for movable support over the ground in a first direction;

(b) a supply hopper mounted to said frame;

(c) a broadcast hopper mounted to said frame and spaced from said supply hopper, and extending generally transversely to said first direction;

(d) said implement frame having a center frame section and a plurality of wing frame sections oppositely positioned adjacent said center frame section and having ground-engaging wheels for support, said center frame section including pivot means connecting said wing frame sections to opposite ends of said center frame section for folding;

(e) said broadcast hopper including a central drill box mounted on said center frame section;

(f) said broadcast hopper including a plurality of wing section drill boxes mounted on a respective said wing frame section and extending generally longitudinally of said central drill box and in flow communication therewith, each of said wing section drill boxes having outer ends;

(g) a plurality of planter means supported by said frame and disposed along said broadcast hopper, said broadcast hopper being in flow communication with said planter means for broadcast of said material in the ground upon operational movement of said implement frame;

(h) a first supply auger supported by said frame and extending generally in said first direction, said first supply auger being connected to said supply hopper and to said broadcast hopper and being in flow communication therebetween;

(i) a first distribution auger supported by said frame and extending generally transversely to said first direction along said broadcast hopper, said first distribution auger being in flow communication with said first supply auger and adapted to transfer material from said supply auger to said central and wing drill boxes of said broadcast hopper;

(j) motive means connected to and driving said first supply auger and said first distribution auger;

(k) each of said wing frame sections having a wing distribution auger in flow communication with said first distribution auger and adapted to transfer material from said central drill box to said wing drill boxes;

(l) each of said wing frame sections having a wing drive shaft running generally parallel to said wing distribution augers and operatively connected to said wing distribution augers at respective outer ends thereof; said wing drive assembly being connected to said motive means for driving said wing drive assembly and said wing distribution auger; and (m) control means at said wing section drill box outer ends and sensitive to the presence of excess material delivered by respective said wing distribution augers, said control means being adapted to deactuate said first supply and distribution augers upon said presence of said excess material.

4. The drill implement as set forth in claim 3 wherein:

(a) said wing drive assembly is operatively connected to said first distribution auger and to said motive means such that said first distribution auger and said wing drive assembly are driven in unison.

5. A drill implement comprising:

(a) an implement frame having a plurality of ground-engaging wheels for movable support over the ground in a first direction;
(b) a supply hopper associated with said frame;
(c) a broadcast hopper associated with said frame and spaced from said supply hopper, said broadcast hopper extending generally transversely to said first direction and having outer ends remote from said first supply auger;
(d) a first supply auger supported by said frame and extending generally horizontally in said first direction, said first supply auger being connected to said supply hopper and to said broadcast hopper and being in flow communication therebetween;
(e) a first distribution auger supported by said frame and extending generally horizontally and transversely to said first direction along said broadcast hopper, said first distribution auger being in flow communication with said first supply auger and adapted to transfer material from said supply auger to said broadcast hopper;
(f) motive means connected to and driving said first supply auger and said first distribution auger;
(g) a plurality of planter means supported by said frame and disposed along said broadcast hopper, said broadcast hopper being in flow communication with said planter means for broadcast of said material in the ground upon operational movement of said implement frame;
(h) a differential assembly connected to said motive means for receiving power therefrom; said different assembly connecting right and left side auger shafts of said first distribution auger and differentially supplying power to said right and left side auger shafts; and
(i) control means at said broadcast hopper outer ends and sensitive to the presence of excess material delivered by said first distribution auger to said outer end, said control means being adapted to deactuate said first supply auger and said first distribution auger upon said presence of excess material and including:
  (1) a sensor for sensing an accummulation of excess material; and
  (2) a control switch connected to said sensor and responsive to a second accummulation of excess material to deactuate said motive means.

6. A foldable drill implement comprising:
(a) an implement frame having a tow bar for connection to a prime mover and a plurality of ground-engaging wheels for movable support over the ground in a first direction;
(b) a supply hopper mounted to said frame and having a first compartment for storing a first material;
(c) a broadcast hopper mounted to said frame, spaced from said supply hopper and extending generally transversely to said first direction;
(d) said implement frame having a center frame section and right and left wing frame sections oppositely positioned adjacent said center frame section and having ground-engaging wheels for support;
(e) said broadcast hopper including a central drill box mounted on said center frame section;
(f) said broadcast hopper including right and left side wing section drill boxes mounted on a respective said wing frame section and extending generally longitudinally of said broadcast hopper and in flow communication therewith, each of said wing section drill boxes having outer ends;
(g) a plurality of planter means connected to said center frame section and said wing frame sections and in flow communication with said broadcast hopper and said wing section drill boxes for broadcast of the first material;
(h) a first supply auger supported by said frame, extending generally longitudinally of said first direction and extending between said first compartment and said broadcast hopper in flow communication therewith;
(i) a first distribution auger supported by said frame, extending generally transversely to said first direction and extending lengthwise through said central drill box in flow communication with said first supply auger for transferring the first material from said first compartment to said broadcast hopper and maintaining a level of fill therein;
(j) right and left side wing distribution augers, each mounted in a respective wing frame section and extending the length thereof; each of said first wing distribution augers being connected to respective opposite ends of said first distribution auger and in flow communication therewith;
(k) pivot means connecting said center frame section and said wing frame sections and providing rotational folding movement therebetween;
(l) motive means for driving said first supply auger, said first distribution auger;
(m) right and left side wing drive assemblies for driving said right and left side wing distribution augers, respectively, said wing drive assemblies each including:
  (1) a central drive shaft received in said central drill box and extending lengthwise therethrough in generally parallel relation to said first distribution auger;
  (2) a wing drive shaft received in a respective wing section drill box and extending lengthwise therein in generally parallel relation to a respective wing distribution auger; and
  (3) a U-joint connecting said central drive shaft and said wing drive shaft along an axis about which said pivot means fold a respective wing frame section relative to said center frame section; and
(n) control means located at said wing section drill box outer ends and sensitive to the presence of excess material delivered by respective said wing distribution augers, said control means being adapted to deactuate said first supply auger upon said presence of said excess material.

* * * * *